(12) United States Patent
Avasarala et al.

(10) Patent No.: US 8,412,659 B2
(45) Date of Patent: Apr. 2, 2013

(54) SEMI-AUTOMATED AND INTER-ACTIVE SYSTEM AND METHOD FOR ANALYZING PATENT LANDSCAPES

(75) Inventors: Viswanath Avasarala, Schenectady, NY (US); John Erik Hershey, Ballston Lake, NY (US); Anil Varma, Clifton Park, NY (US); Piero Patrone Bonissone, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 952 days.

(21) Appl. No.: 12/463,731

(22) Filed: May 11, 2009

(65) Prior Publication Data
US 2010/0287478 A1    Nov. 11, 2010

(51) Int. Cl.
G06F 17/00 (2006.01)
G06N 5/00 (2006.01)

(52) U.S. Cl. ........................................................ 706/45
(58) Field of Classification Search .................. None
See application file for complete search history.

(56) References Cited

U.S. PATENT DOCUMENTS

| | | | |
|---|---|---|---|
| 7,117,198 B1 * | 10/2006 | Cronin et al. ........................ 1/1 |
| 2003/0229470 A1 | 12/2003 | Pejic | |
| 2004/0181427 A1 | 9/2004 | Stobbs et al. | |
| 2005/0210009 A1 | 9/2005 | Tran | |
| 2005/0234738 A1 | 10/2005 | Hodes | |
| 2006/0106847 A1 | 5/2006 | Eckardt, III et al. | |
| 2007/0073748 A1 | 3/2007 | Barney | |
| 2007/0276796 A1 | 11/2007 | Sampson | |
| 2008/0195567 A1 * | 8/2008 | Chen et al. ........................ 706/46 |
| 2008/0195568 A1 * | 8/2008 | Chen et al. ........................ 706/50 |
| 2008/0195678 A1 * | 8/2008 | Chen et al. ........................ 707/205 |
| 2008/0235220 A1 * | 9/2008 | Chen et al. ........................ 707/5 |
| 2008/0243889 A1 * | 10/2008 | Chen et al. ........................ 707/100 |
| 2010/0131513 A1 * | 5/2010 | Lundberg et al. ............. 707/741 |

OTHER PUBLICATIONS

Yoon, Byungun et al.; "A text-mining-based patent network: Analytical tool for high-technology trend"; 2004; Journal of High Technology Management Research 15; pp. 37-50.*
Yang, YunYun et al.; "Text mining and visualization tools—Impressionof emerging capabilities"; 2008; World Patent Information 30; pp. 280-293.*
Kim, Young Gil et al.; "Visualization of patent analysis for emerging technology"; 2008; Expert Systems with Applications 34; pp. 1804-1812.*
Andy Gibbs: "Latent Symantic Analysis: New Intellectual Property Data Search Technology for Non-Obvious Licensing Opportunities"; Patent Cafe; LES2004 Winter Meeting: Licensing Converging Technologies-Bridging the Gap; 4 Pages.
John E. Hershey and John F. Thompson; "White Space Patenting"; Intellectual Property Today August, 2004; 5 Pages.
Patent Cafe; ICO Suite App Notes; "Using a Semantic Engine: Identify Best Technologies for In-Licensing"; Downloaded from Internet:<http://www.patentcafe.com/index.asp?body=support&page=downloads>; 1Page.

(Continued)

Primary Examiner — Jeffrey A Gaffin
Assistant Examiner — Stanley K Hill
(74) Attorney, Agent, or Firm — Joseph J. Christian

(57) ABSTRACT

A semi-automated method for interactively analyzing a patent landscape in one embodiment includes retrieving a plurality of relevant patents indicative of a predetermined conceptual region of the patent landscape from a patent repository using a query. Competitive analysis of the plurality of relevant patents is conducted using an interactive network-based visualization technique. The competitive analysis is used for intellectual property enforcement, due diligence, and strategic investment analysis.

9 Claims, 8 Drawing Sheets

OTHER PUBLICATIONS

Patent Cafe; ICO Suite App Notes; "Intellectual Property Best Practices: Best-In-Class Tools Support IAM Strategy and Operations"; Downloaded from Internet:<http://www.patentcafe.com/index.asp?body=support&page=downloads>; 1Page.

Patent Cafe; ICO Suite App Notes; "Patent Factor Reports: A Statistical Tool for Qualitative Portfolio Analysis"; Downloaded from Internet<http://www.patentcafe.com/index.asp?body=support&page=downloads>; 1Page.

* cited by examiner

SEMI-AUTOMATED AND INTER-ACTIVE SYSTEM AND METHOD FOR ANALYZING PATENT LANDSCAPES

BACKGROUND

Modern business intelligence routinely makes extensive use of customer and transactional data obtained from databases stored in data warehouses. Such business intelligence may typically be obtained by posing an analytical search and/or query to one or more associated relational databases. Intellectual property (IP) intelligence, in particular, is very useful to the competitive advantage of a business entity. The business entity may seek to maximize the value of its IP by investigating and identifying areas of relevant patents for example, "white space" in an industry, where white space is a term generally used to designate one or more technical fields in which little or no IP may exist therefore helping to identify opportunities.

A patent landscape study is a comprehensive analysis of patents and patent applications to benefit business managers, product managers, technical personnel, and patent attorneys. A patent landscape study provides a map with detailed patent activity in specific technology areas that significantly improves the ability to make sound major business decisions. Each patent landscape study may include a comprehensive report and a customized database. The report may include trends and directions in the technology field of interest and includes pivotal information on key technology providers. The database may include essential data on each patent, a description of its importance, an assessment of each invention as either a fundamental discovery or an incremental improvement, and the technical problems it solves. In typical cases, the patents are ranked by relevance to the technology at hand or to the demands of the customer.

However, most of the known analysis tools are inadequate, cumbersome, labor intensive, and cannot perform automated analysis. Also, the known tools cannot perform higher-order analysis. In other words, the tools perform only superficial analysis and require knowledgeable and skilled review and analysis to generate a useful output. Since there is a subjective nature to the analysis, the output can vary depending upon the person performing the searching and refinement of the data. Furthermore, most tools operate in batch mode, so the process itself cannot provide additional information, since it is not transparent to the user.

There is a general need for improved competitive analytics for Intellectual Property. An automated, interactive system and method that is easy to use and can perform a higher-order analysis of patents is also desirable.

BRIEF DESCRIPTION

In accordance with one exemplary embodiment, a semi-automated method for interactively analyzing a patent landscape is disclosed. The method includes retrieving a plurality of relevant patents indicative of a predetermined conceptual region of the patent landscape from a patent repository using a query. Competitive analysis of the plurality of relevant patents using an interactive network-based visualization technique is conducted. The competitive analysis may be used for intellectual property enforcement, due diligence, and strategic investment analysis.

In accordance with another exemplary embodiment, a semi-automated method for interactively analyzing a patent landscape is disclosed. The method includes retrieving a plurality of relevant patents indicative of a predetermined conceptual region of the patent landscape from a patent repository using a query. Competitive analysis of the plurality of relevant patents using an interactive network-based visualization technique is conducted. The interactive network-based visualization technique is augmented using one or more reasoning techniques. The competitive analysis may be used for shaping the development of new inventions (avoiding known barriers to practice while pursuing white spaces), deciding on each invention's potential for a successful patent filing or on its merits for a renewal, enforcing intellectual properties, performing due diligences, identifying suitable joint venture partners, and defining strategic investments.

In accordance with another exemplary embodiment, a semi-automated method for interactively analyzing a patent landscape is disclosed. The method includes retrieving a plurality of relevant patents indicative of a predetermined conceptual region of the patent landscape from a patent repository using a query. Competitive analysis of the plurality of relevant patents using an interactive network-based visualization technique is conducted. The interactive network-based visualization technique is augmented using one or more reasoning techniques. The white space opportunities are evaluated based on the augmented interactive network-based visualization technique. The competitive analysis may be used for shaping the development of new inventions, deciding on each invention's potential for a successful patent filing or on its merits for a renewal, enforcing intellectual properties, performing due diligences, identifying suitable joint venture partners, and defining strategic investments.

In accordance with another exemplary embodiment, a semi-automated system for interactively analyzing a patent landscape is disclosed. The system includes an input device configured to input a query to a patent database. An interactive analytical tool is communicatively coupled to the patent data base and configured to extract a plurality of relevant patents indicative of a predetermined conceptual region of the patent landscape; conduct competitive analysis of the plurality of relevant patents using an interactive network-based visualization technique; augment the interactive network-based visualization technique using one or more reasoning techniques; and evaluate white space opportunities based on the augmented interactive network-based visualization technique. An output device is configured to display an output indicative of an analysis output from the analytical tool. The output may be used for shaping the development of new inventions, deciding on each invention's potential for a successful patent filing or on its merits for a renewal, enforcing intellectual properties, performing due diligences, identifying suitable joint venture partners, and defining strategic investments.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The system and techniques relate generally to the analysis of patents, and more specifically, to a semi-automated and interactive system and method for analyzing patent landscape and suggesting potential conclusions and predictions.

In accordance with the embodiments, a semi-automated system and method for interactively analyzing a patent landscape is disclosed. One exemplary technique includes performing competitive analysis by analyzing a database with potentially relevant patents indicative of a predetermined conceptual region of the patent landscape, understanding cross-company patent landscape, understanding relative strengths and weaknesses, understanding semantically adjacent domains, understanding temporal trends, and identifying seminal patents categorized by area. The technique may further include intellectual property prospecting by identifying white space opportunities, and projecting temporal trends by identifying emerging opportunities and estimating growth potentials. Automated and/or semi-automated interactive reasoning and visualization facilitates in the performance of strategic assessments, comparative patent analyses, assessing the value of white spaces, and to project potential growth of emerging opportunities.

Figure 1:
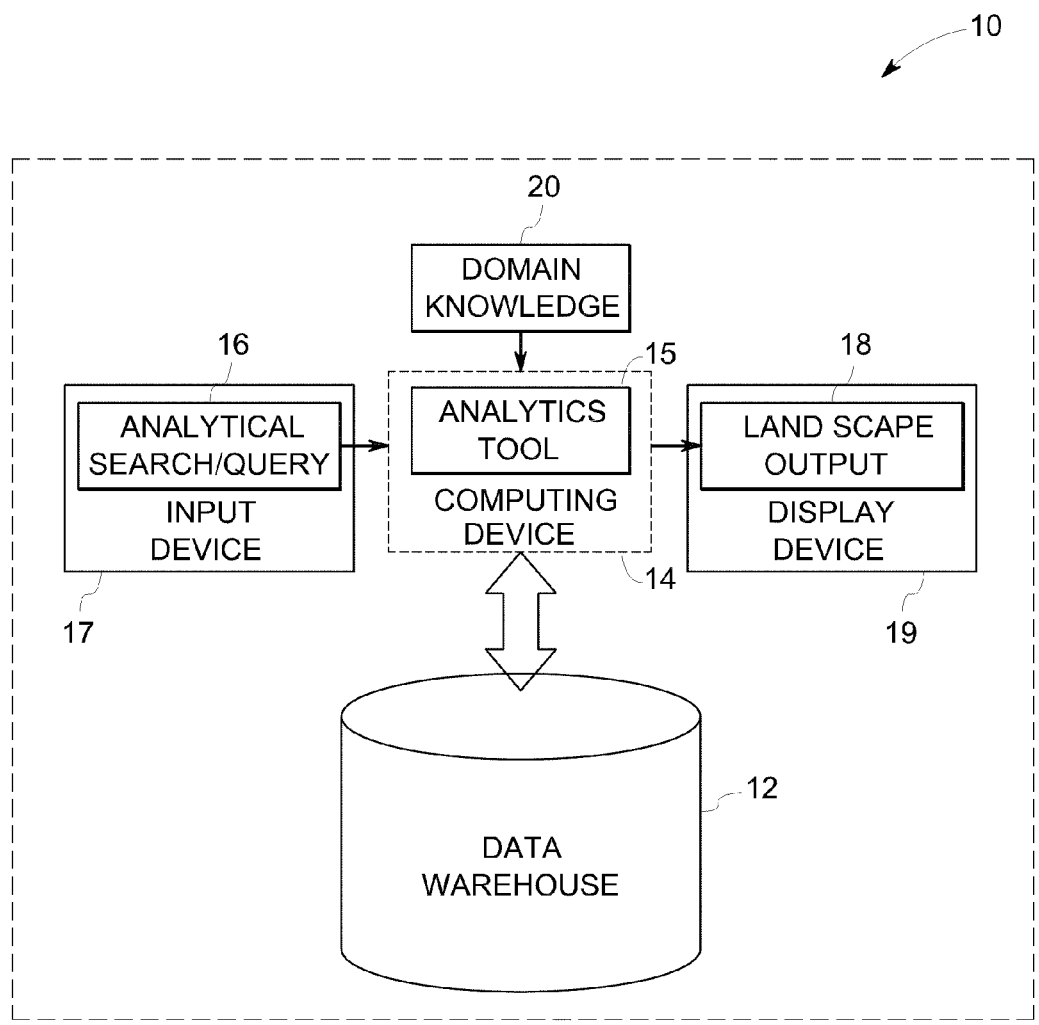
FIG. 1 is a diagrammatical representation of a semi-automated system for interactively analyzing a patent landscape in accordance with an exemplary embodiment.

Referring to FIG. 1, a semi-automated system 10, for example a computer system for interactively analyzing a patent landscape is disclosed. The system 10 includes a data warehouse 12 that may include, in particular, one or more databases useful in intellectual property analysis such as: a worldwide patent (WWP) database; a web, scientific, and news (WSN) database; a financial (EFD) database, or the like. The data warehouse 12 may also include information about the documents included in the various database included therein. The database 12 can be, for example, one or more local databases coupled to a computing device 14 or one or more databases accessible via an internet, intranet or area network. The computing device 14 hosting an analytics tool 15 may access the data warehouse 12 to perform a number of functions, including: extracting patents and related documents, automatically classifying patents, performing contingency analysis, and analyzing various relationships among patents and companies, as described in greater detail herein.

An analytical search/query 16 is coupled to the analytics tool 15 and ultimately to the data warehouse 12 (repository) via an input device 17, for example a keyboard, mouse, touchscreen, or other input mechanism such as a microphone with speech to text conversion. One or more terms such as keywords, classification codes or other characteristics are used to perform searching of the database(s).

In one example, a user interested in patent analysis, for example, a patent landscape analysis, would initiate queries via the input device 17 for processing for a task, herein broadly denoted as a landscape output 18. The searching in this context may reference the term patents, and in this context it refers to patents and patent applications that can be from the various countries, regional offices, and filing organizations such as the World Intellectual Property Organization (WIPO) that administers the Patent Cooperation Treaty. The output 18 may be displayed via a display device 19 such as a monitor. A set of domain knowledge inputs 20 provided by one or more domain experts or users may be applied to execute or enhance one or more of the functions performed by the analytics tool 15. For example, a process of analyzing relationships among patents and companies may invoke both the expertise of an individual skilled in the technology of document classification and the expertise of a domain expert skilled in the technology of the patents under analysis.

In one example, the analytics tool 15 may use a search tool to identify a set of companies in an industry of interest; retrieve patents and other related materials, including web pages that describe technology and products currently relevant to the industry of interest, or the like. For example, the search is executed, and a query is performed using the results of the search to retrieve a collection of documents matching initial search criteria. For example, an industry may be selected, given one or more companies that are representative of that industry. One or more terms such as keywords, industry classification codes or other characteristics that describe the selected industry. Patents and other files, either assigned to the selected companies or related to the keywords, may be extracted from the database to form a first set, or collection of extracted documents. Second tier companies (other companies related to the given companies but not represented in the first set) may be found by looking across structured features and unstructured features for common characteristics shared by the patents and the other files in the first document set. Examples of structured features in a patent may include: name of inventor, name of assignee, classification of the patent, and documents referenced by the patent. Examples of unstructured features may include regular text, such as may be found in the abstract, the claim language, or in the title of the patent or document. An unstructured feature that may be converted into a structured feature is referred to herein as an "annotation."

This conversion process may include, for example, recognizing a pattern, using a synonym from a dictionary, or equating the idea conveyed by text to a structured concept. Patents and other files assigned to the second tier companies may be extracted from the database warehouse 12 to form a second set of documents. Additional documents related to the second tier companies may be retrieved using the keywords and/or one or more web queries on an existing web store, and may be included in the second document set. The first document set and the second document set may be combined to form yet another set, referred to herein as a third document set. Subsequently, the analytics tool 15 may use a document classification technology, or taxonomy generation technology, to classify the retrieved patents and other related materials. It should be noted herein that the system 10 described herein is an exemplary embodiment and should not be construed in any way as limiting. The configuration of the system 10 may vary depending upon the application.

In accordance with an exemplary embodiment of the present system, the analytics tool 15 may use statistical improbable phrases (SIP) to define unique signatures for each patent. SIP is also used more generally to refer to a search string likely to generate meaningful results from a search engine; that is, a string whose chance of occurring in a desirable result is much greater than its chance of occurring in a non-desirable result. Metric parameters for SIP include term frequency (denoted $tf_{ij}$) by of a term "$w_i$" in a document $d_j$ is the number of occurrences of "$w_i$" in "$d_j$", collection frequency (denoted by $cf_i$) of a term "$w_i$" is the total number of occurrences of a term "$w_i$" in a collection of documents, document frequency (denoted by $df_i$) of a term "$w_i$" is the number of documents in the collection in which "$w_i$" occurs at least once.

More specifically, the term frequency $tf_{ij}$ is computed as:

$$tf_{i,j} = \sum_{r=1}^{L_j} I_1(i, r; j), \text{ where } I_1(i, r; j) = \begin{cases} 1 & \text{if } w_i = w_r \text{ in } d_j \\ 0 & \text{otherwise} \end{cases}$$

where $I_1$ is a binary indicator signaling the presence or absence of word "$w_i$" in document "$d_j$"; the collection frequency $cf_i$ is computed as: $cf_i = \sum_{j=1}^{D} tf_{i,j}$; the document frequency $df_i$ is computed as:

$$df_i = \sum_{j=1}^{D} I_2(i, j), \text{ where } I_2(i, j) = \begin{cases} 1, & \text{if } t_{i,j} > 0 \\ 0, & \text{otherwise} \end{cases}$$

where $I_2$ is a binary indicator signaling that word "$w_i$" occurred at least once in document "$d_j$". With these measures we can compute the inverse document frequency (denoted by $idf_i$), a metric that is minimized for those terms that occur in all documents and is maximized for terms that occur in a single document. Specifically the inverse document frequency is computed as:

$$idf_i = IDF(w_i) = \log\left(\frac{D}{df_i}\right)$$

where "D" is the total number of documents in the collection D. A whole family of weighting schemes (denoted by TF.IDF) that combine a the term frequency with an the inverse document frequency is computed as:

$$TF \cdot IDF(w_{i,j}) = t_{i,j} \times \log\frac{D}{df_i} = t_{i,j} \times idf_i$$

An alternative weighting scheme is the residual inverse document frequency (denoted by RIDF), which is computed as:

$$RIDF(w_i) = \log_2\frac{D}{df_i} - \log_2\left(1 - e^{\frac{-cf_i}{D}}\right) = idf_i - \log_2\left(1 - e^{\frac{-cf_i}{D}}\right)$$

"RIDF" is the difference between the logs of the "actual sample idf" and the "idf expected". "RIDF" tends to highlight technical terminology, names, and good keywords for information retrieval.

Figure 2:
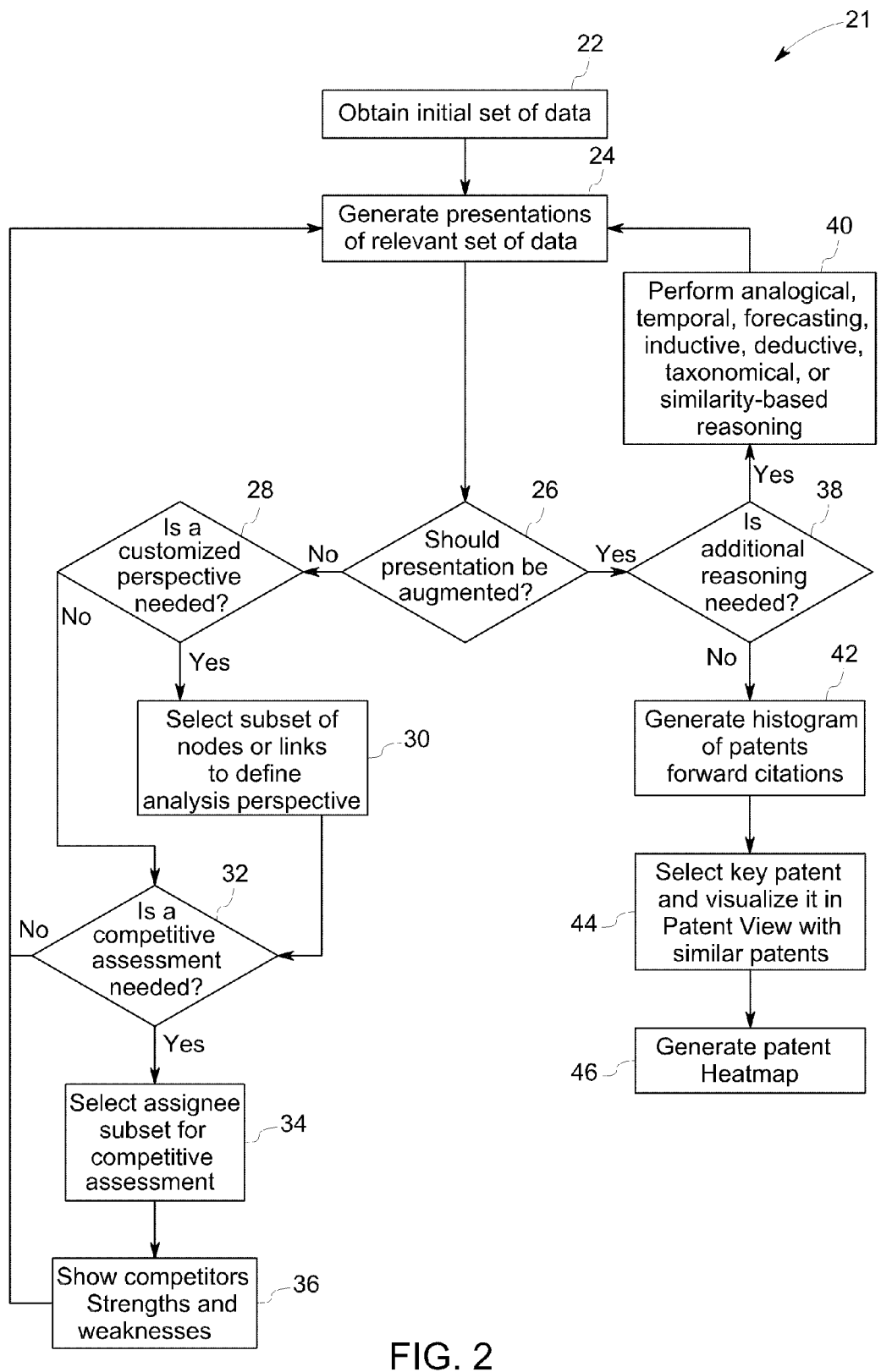
FIG. 2 is a flowchart for the processing in accordance with an exemplary embodiment.

A process flow indicated by 21 according to one embodiment is depicted in FIG. 2. Although there are a number of depicted process steps, at any step in this process, it is possible to export materials such as patents of interest for further refinements or analyses. The processing commences with identifying the relevant set of data for processing indicated by 22. In one embodiment, this is performed by establishing the queries to define a set of relevant data from a larger data set that may be, for example, a collection of patents residing on one or more servers and one or more databases. The queries can be vetted to obtain a more appropriate data set for the specific application via multiple revisions to obtain the relevant data set.

The relevant set of data in one example is used to generate various presentations indicated by 24, which in one embodiment is performed by visualizing the data as a concept view, patent view, and/or generating various pie charts and heat maps such as by assignee, for example. In one example the visualized data is represented as nodes with links between the nodes wherein the size/shape of the nodes and the length/thickness of the links can be used to indicate certain characteristics of the relationships. The set of relevant data can be examined as to whether further processing is needed to augment the data presentation indicated by 26. For example, a graph size may be augmented, by adding new nodes and links. The user-provided node set may be augmented with additional nodes mined from a corpus. It is also possible to complement the lexical description with semantic knowledge (domain ontologies and rule sets) and leverage relationships from similar domains to increase graph connectivity (nodes and links).

If further processing of the set of relevant data is not needed to augment the data presentation, then the data set can be examined as to whether further processing is required to establish a customized perspective view depending on the requirements of a user indicated by 28. If the customized perspective view is desired, then a required subset of nodes and/or link of the visual presentation are selected from among the plurality of nodes and links to define the customized perspective view indicated by 30. If the customized perspective view is not desired, the data set can be examined as to whether competitive assessment is needed indicated by 32. Then required subset of assignee is selected from among the plurality of assignees for competitive assessment indicated by 34. The strengths and weaknesses of the selected assignees are analyzed indicated by 36. The competitive assessment facilitates the customization of the data presentation depending on the user requirement.

If further processing of the set of relevant data to augment the data presentation is needed, the set of relevant data can be examined to establish if additional reasoning techniques need to be applied to augment the data presentation indicated by 38. If it is established that additional reasoning techniques are required, then analogical, temporal, forecasting, inductive, deductive, taxonomical, similarity-based reasoning techniques, or combinations thereof may be applied to augment the data presentation indicated by 40.

If it is established that additional reasoning technique is not required, a histogram of patent forward citations of the data set is generated indicated by 42. The process flow may further include selecting a key required patent and visualizing the selected patent in patent view along with similar patents of the data set indicated by 44. The process flow may also include generating a patent heat map of the data set indicated by 46. It should be noted herein that the process flow illustrated herein is an exemplary embodiment and there is no requirement that the process flow proceed in a particular order, and the order and number of the steps may vary depending on the requirement.

Figure 3:
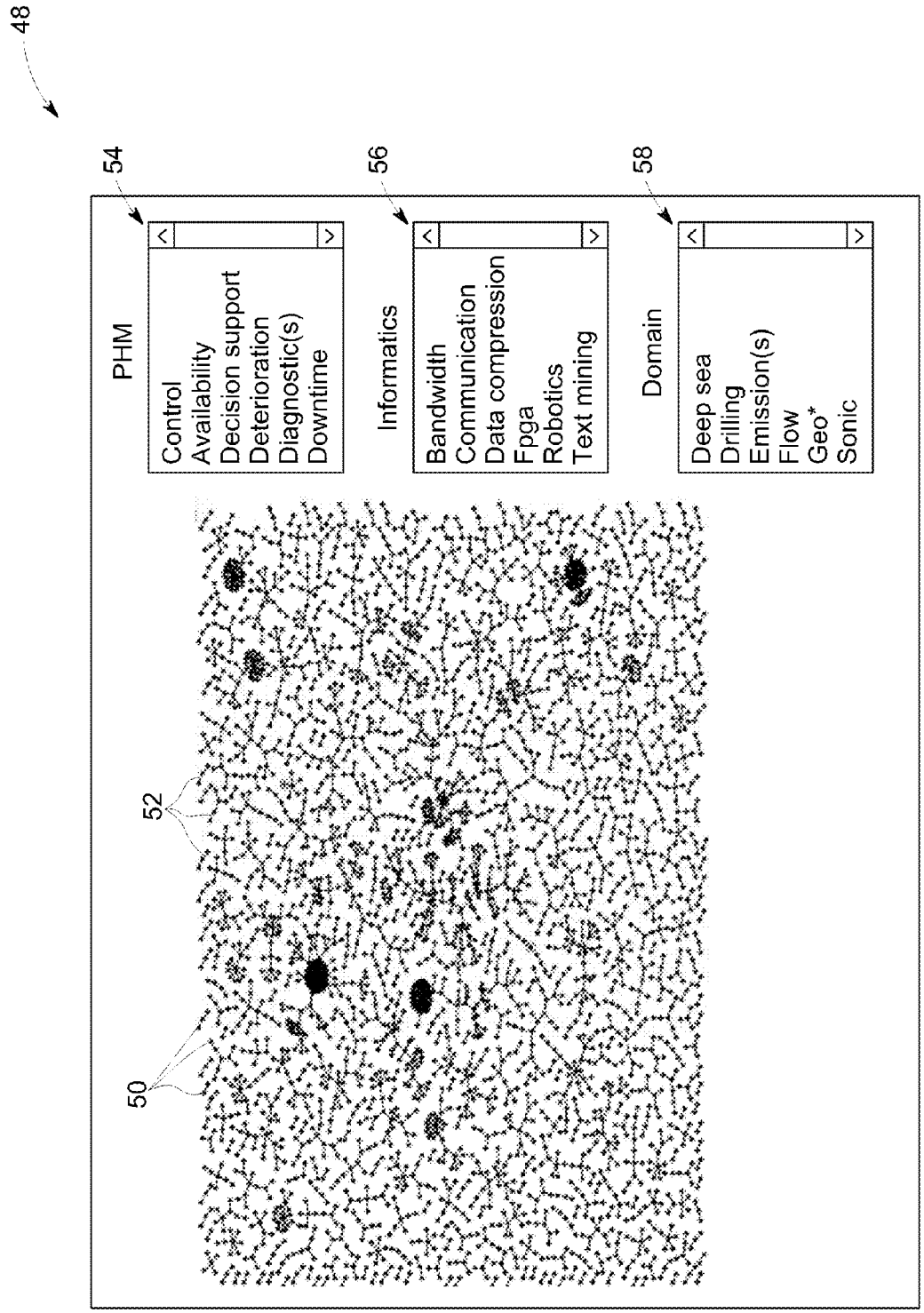
FIG. 3 is a patent map generated by an analytical tool of a semi-automated system configured for interactively analyzing a patent landscape in accordance with an exemplary embodiment.

Referring to FIG. 3, a patent map 48 generated by the analytic tool is disclosed for illustrative purposes. The map 48 includes a cluster of retrieved references (cited patents) indicated by several nodes 50 linked to each other via link lines 52. The map 48 is generated based on the defined functions and domain, and in this example, a particular patent is identified and the analytic tool applies certain filters to create the patent map 48. In the illustrated example, the map 48 is indicative of prognostic and health management area (PHM or conceptual region). The functions or PHM 54 may be defined by keywords such as anomaly detection, anomaly identification, asset management, availability, control, or the like. The informatics 56 indicates attributes such as bandwidth and communications. The domain 58 may be defined by keywords including acoustic, deep sea, drilling, emissions, flow optimization, or the like. It should be noted herein that in the map 48, proximity of one node with one or more other nodes is indicative of conceptual similarity in the patent landscape. The map 48 is explained in greater detail with reference to subsequent figures.

Figure 4:
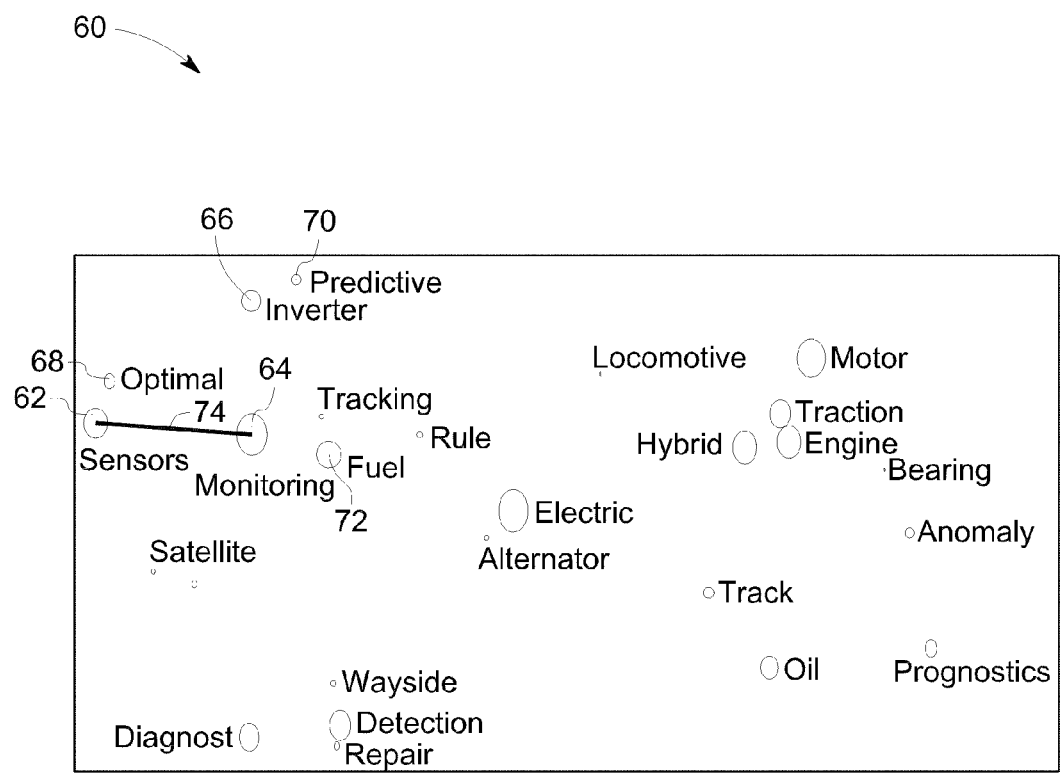
FIG. 4 is a patent map generated by an analytical tool of a semi-automated system configured for interactively analyzing a patent landscape in accordance with an exemplary embodiment.

Referring to FIG. 4, a concept perspective map view 60 is disclosed. The concept view 60 is generated by the analytical tool using, for example, an interactive network-based visualization technique for performing competitive analysis. In other words, the concept perspective map view 60 is an interactive graphical representation of a plurality of nodes inter-coupled through links. Each node disclosed herein is indicative of a number of patents of the patent landscape including a term representative of the node. Each link is indicative of number of patents of the patent landscape including one or more terms representative of the nodes coupled via the link. The map view 60 may be subjected to interactive graphical representation via rotations and zooming operations.

In the illustrated example, the concept map view 60 is indicative of cross-company landscape of two competitors, for example competitor ABC, and competitor XYZ in a predefined technology area. A few of the nodes and links are referenced herein for describing the illustrated embodiment. For example, one node 62 may be indicative of a sensor domain, another node 64 may be indicative of a monitoring domain, another node 66 may be indicative of an inverter domain, node 68 may be indicative of an optimal domain, node 70 may be indicative of a predictive domain, node 72 may be indicative of a fuel domain, and so forth. As noted, the node 62 is linked to node 64, via a link 74, in this example.

A node diameter is indicative of the number of patents with reference to the associated domain, international patent classification, United States patent classification, and so forth. The node color may also be indicative of a particular characteristic associated with a particular competitor. For example, a red node may be indicative of competitor ABC having higher number of patents than the competitor XYZ in the associated domain area. A green node may be indicative of competitor XYZ having higher number of patents than the competitor ABC in the associated domain area. The distance between two particular nodes may be indicative of similarity in domains associated with the particular nodes.

Similarly, the link color may also be indicative of a particular characteristic associated with a particular competitor. For example, a red link may be indicative of competitor ABC having higher number of patents than the competitor XYZ in the intersection of the domain areas associated with the nodes coupled by the particular red link. In other words, if the node associated with sensor domain is linked via a red link to the node associated with the monitoring domain, the red link may be indicative of competitor ABC having higher number of patents than the competitor XYZ in the intersection of the domain areas (overlapping sensor and monitoring domain areas). A green link may be indicative of competitor XYZ having higher number of patents than the competitor ABC in the intersection of the domain areas associated with the nodes coupled by the particular green link. Thickness of a particular link may be indicative of the number of patents associated with the domains indicative of the nodes coupled via the particular link. The disclosed example is an exemplary embodiment and should not be construed as limiting. The number of nodes, node color, link color, and domain area may vary depending upon the application.

The visualization modes of the map 60 may be switched to provide further features of the system. The visualization modes may include patent scope, patent status, assignee, node cardinality (patent count associated to the node), link cardinality (patent count associated to the link), filed date, issue date, patent quality, or combinations thereof. The patent scope may include such items as title, abstract, claim(s), or entire specification. The patent status may include currently active issued patents, or issued patents, or issued and published patents as well as data related to active or abandonment. The assignee scope may include reference assignee, or set of assignees including reference assignee, post assignments, or all assignees. The patent quality may include seminal patents or all patents.

The concept map 60 provides a summary snapshot of the relationship between the various patents and patent applications in a format that is rich in content to the viewer. Furthermore, the viewer can adjust the parameters on the fly and obtain various perspective views of the relationships.

Figure 5:
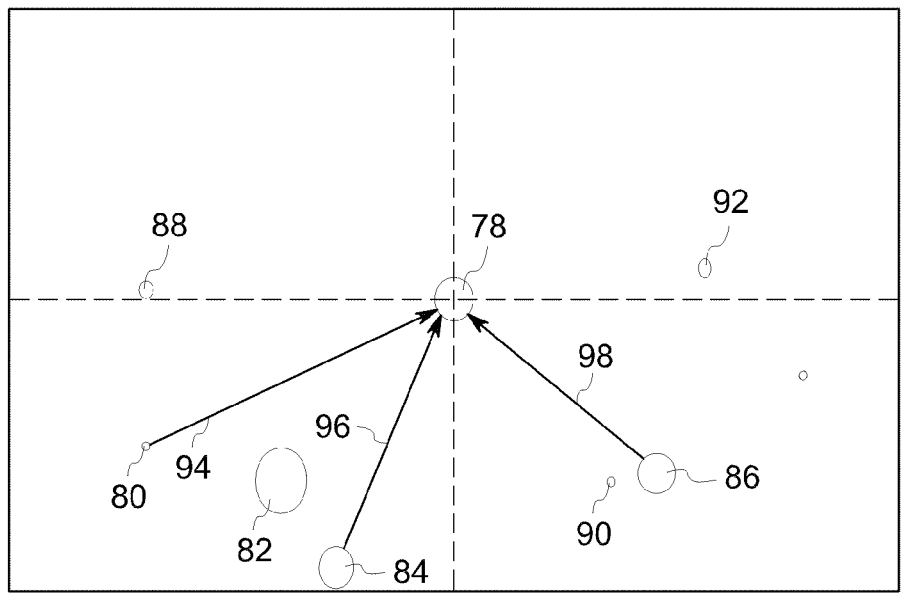
FIG. 5 is a focused view of a patent map generated by an analytical tool of a semi-automated system configured for interactively analyzing a patent landscape in accordance with an exemplary embodiment.

Referring to FIG. 5, a perspective patent view of the entities and relationships is represented as 76. As noted, the term patent as used herein refers to issued patents and published patent applications. Issued patents and published patent applications may include United States issued patents and published patent applications, and foreign issued patents and published patent applications, reissued patents, or the like. The patent map view 76 is generated by the analytical tool using, for example, an interactive network-based visualization technique for performing competitive analysis. In other words, the patent map view 76 is an interactive graphical representation of a plurality of nodes inter-coupled through links for a particular patent. For example, a plurality of nodes 78, 80, 82, 84, 86, 88, 90 and 92 are referenced herein, wherein each node denotes a patent. The nodes 80, 84, and 86 are coupled to the node 78 via the links 94, 96, and 98 respectively. In the illustrated embodiment, the base patent 78 is located at the origin. The size of a node in this example is proportional to the number of forward citations, which refers to the number of times a patent is referenced by another patent, typically via the Information Disclosure Statement in the U.S. Patent Office although various search reports also track related cases. A node diameter of a particular node is indicative of the number of patent forward citations with reference to the particular node. The node color of a particular node may be indicative of a particular assignee. Distance between two nodes may be indicative of similarity in patents associated with the two particular nodes. A link between two nodes may be indicative of a common factor associated with the patents indicative of the nodes. A link indicated by a solid line may be indicative of common inventor. A link indicated by a dashed line can be used to indicate examination by a particular patent examiner.

It should be noted herein that relative strengths and weaknesses of one or more assignees (competitors) can be analyzed based on a general view, competitive view, focused view, focused competitive view, or combinations thereof of nodes and links. Factors including node size, and link thickness may be indicative of the general view of all assignees or a single assignee. The competitive view for a set of assignees may include selecting reference assignee from a set of assignees, node and link color representative of assignee with larger patent count for selected terms (concepts), and changing reference assignee within a set of assignees to analyze local intellectual property dominance. The focused view of the map includes focusing on a node of interest to sharpen analysis perspective and define a relatively smaller intellectual property region.

In one embodiment, the focused view also includes establishing a conceptual node neighborhood. In other words, the conceptual node neighborhood includes viewing all other nodes directly linked to the node-of-interest and identifying the closest conceptual neighbors. Other intra-node links are not shown except for links coupled to the node-of-interest. In the illustrated embodiment, the node-of-interest is the node 78 and the conceptual node neighborhood includes nodes 80, 82, 84, 86, 88, 90 and 92. The focused view further includes establishing a conceptual sub-graph neighborhood. In other words, the conceptual sub-graph neighborhood includes viewing all other nodes directly linked to node-of-interest including all other intra-node links. The coverage of a set of keywords may also be evaluated by adding patent count of disjointed node intersections with a reference node-of-interest and then comparing the added patent count to the patent count of the reference node-of-interest to identify missing relevant keywords (semantically adjacent concepts).

In an alternate embodiment, a focused competitive view may be performed by evaluating coverage of a set of assignees. In other words, for each node-of-interest, the union of patent counts of all members of a set of assignees is compared with total patent count to identify missing relevant players in the conceptual region.

In certain other embodiments, maps may be generated to study semantically adjacent domains. The subset of keywords may be modified to explore semantically adjacent domains in the patent landscape. Specific nodes-of-interest may be selected to understand the adjacent domains. In one illustrated embodiment, the adjacent domain may include prognostic health management for oil and gas. In another embodiment, the adjacent domain may include prognostic health management for aviation. Any number of adjacent domains is envisaged depending on the application.

In the embodiments discussed above, the interactive graphical representation of a plurality of nodes inter-coupled through links may be augmented using one or more reasoning techniques comprising lexical reasoning, taxonomical reasoning, deductive reasoning, analogical reasoning, temporal reasoning, or combinations thereof. Lexical reasoning may include obtaining a set of keywords by automated keyword extraction and merging results. In other words, user-generated keywords may be merged with relevant words harvested by text-mining corpus. Then an augmented graph may be created. The lexical reasoning also includes classification codes in lieu of keywords wherein patents are classified using US Classifications and International Patent Classifications to segment patents into related groupings. The classification categorization is typically a lexical reasoning that is performed at the patent offices and is initially based on some keyword analysis.

Taxonomical reasoning may include augmenting lexical information by using domain ontologies. The number of links (connectivity) may be increased by "inverse" inheritance. Ontology links are used to extend connectivity of child node to parent node. For example, if node "B" is a child of node "A", and node "B" is coupled to node "C", then node "A" is also coupled to node "C". Taxonomical reasoning may include object taxonomy and function taxonomy. In an object taxonomy scenario, for example, if node 1 is coupled to node 2, this may imply that node 2 is a part of node 1. For a function taxonomy scenario, for example, if node 3 is coupled to node 4, this may imply that node 3 enables node 4. The potential use allows the user to represent taxonomical/ontological domain knowledge to complement the lexical knowledge derived from the keyword set. The connectivity in the graph (new links) is increased, thereby enabling identification of more patents for potential intellectual property leverage, coverage, and region protection.

Deductive reasoning allows augmenting lexical information by using domain rules. A deductive rule of the kind "If A and B then C" implies that a more specific term "C" can be established if terms "A" and "B" are present. This would mean that if the intersection of "A" and "B" would entail C (the size of C is bounded by the size of the intersection). Such rules may be chained. It may be noted herein that deductive reasoning can add new, more specific nodes in the graph by creating new specialized terms that might be used to cover more specifically a niche market.

Analogy is the use of relationships established in one domain and transferred to another domain. For example, if a user analyzes the landscape of a particular domain and determines that node A is not coupled to node D, this may imply that the intersection between node A and node D is empty and is a potential white space opportunity. Yet, in another particular domain, if the same node A is coupled to node D, it may imply that there are patents that share both terms associated with nodes A and D. A user is able to extrapolate that relationship (intersection) to extend the patents of the link AD from one domain to the other domain.

Figure 6:
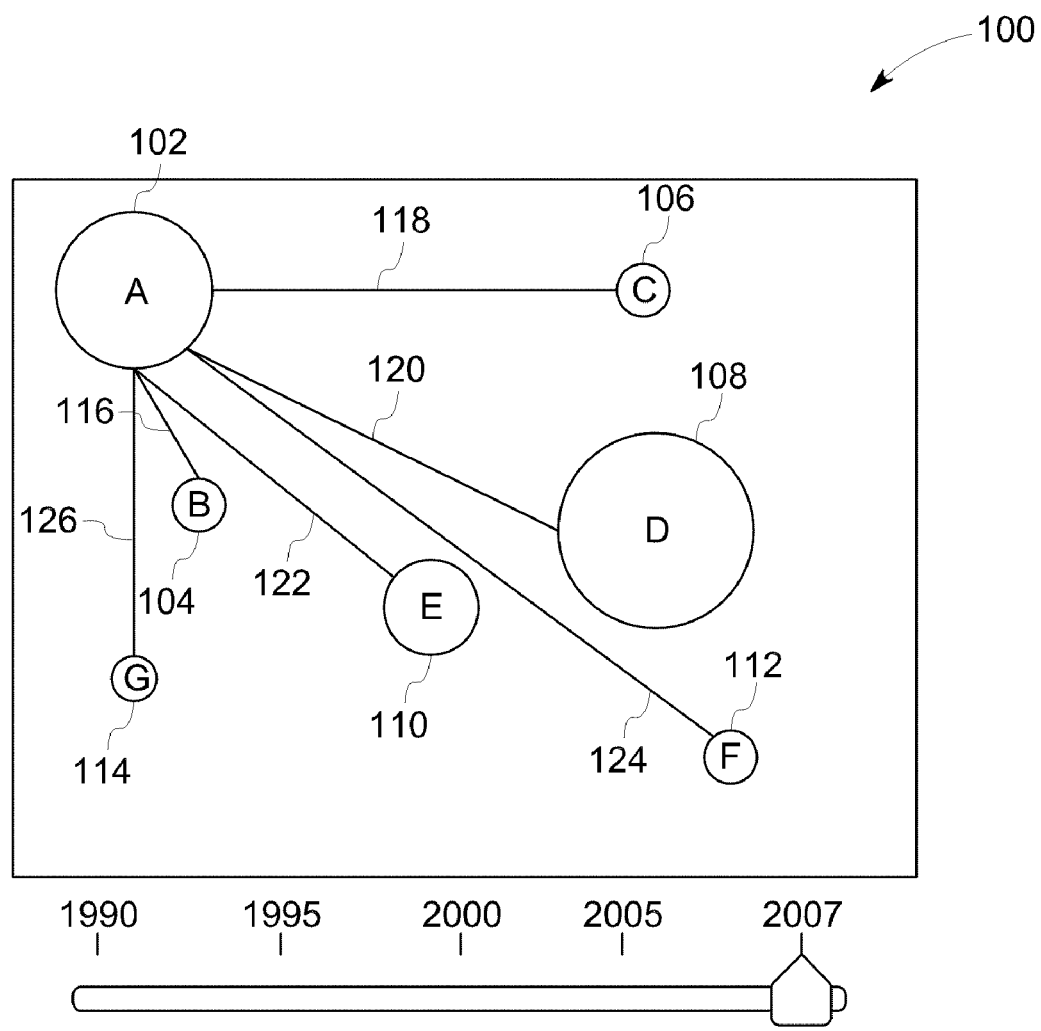
FIG. 6 is a an interactive graphical representation generated by the analytical tool using temporal reasoning in accordance with an exemplary embodiment.

Referring to FIG. 6, a simplified interactive graphical representation 100 generated by the analytical tool using temporal reasoning is disclosed. The representation 100 includes a node 102 coupled to the neighboring nodes 104, 106, 108, 110, 112, 114 via associated links 116, 118, 120, 122, 124, and 126. The representation 100 can be analyzed to explore the temporal trends to visualize areas of growth.

The trend analysis includes analyzing size and thickness of nodes and links. New nodes are indicative of emerging concepts and new links may be indicative of relationships between concepts. Temporal evolution can be analyzed based on patent filing date or patent issue date and/or patent priority date. The illustrated embodiment is indicative of evolution of the concept associated with node 102 with reference to neighboring nodes 104, 106, 108, 110, 112, and 114 over a seventeen year period extending from 1990 to 2007. It may be determined that as the size of node 102 increased, node 108 experienced faster growth, node 110 emerged in the year 2000 and grew, and nodes 112, 114 are the current emerging areas. The potential use of temporal reasoning includes understanding and quantifying temporal dynamics in the region of interest, and identifying fast growing concepts, and emerging connections.

As previously noted, the distance between the nodes is indicative of some attributes associated with the respective nodes and a corresponding similarity. For example, the similarity in the domains can be used to make the distance relationship.

In certain embodiments, seminal patents categorized by area may be identified. In one embodiment, highly coupled nodes in the graphical representation discussed above, may be indicative of seminal patents. The seminal patents may be optionally excluded based on the relative age of the identified patents.

Figure 7:
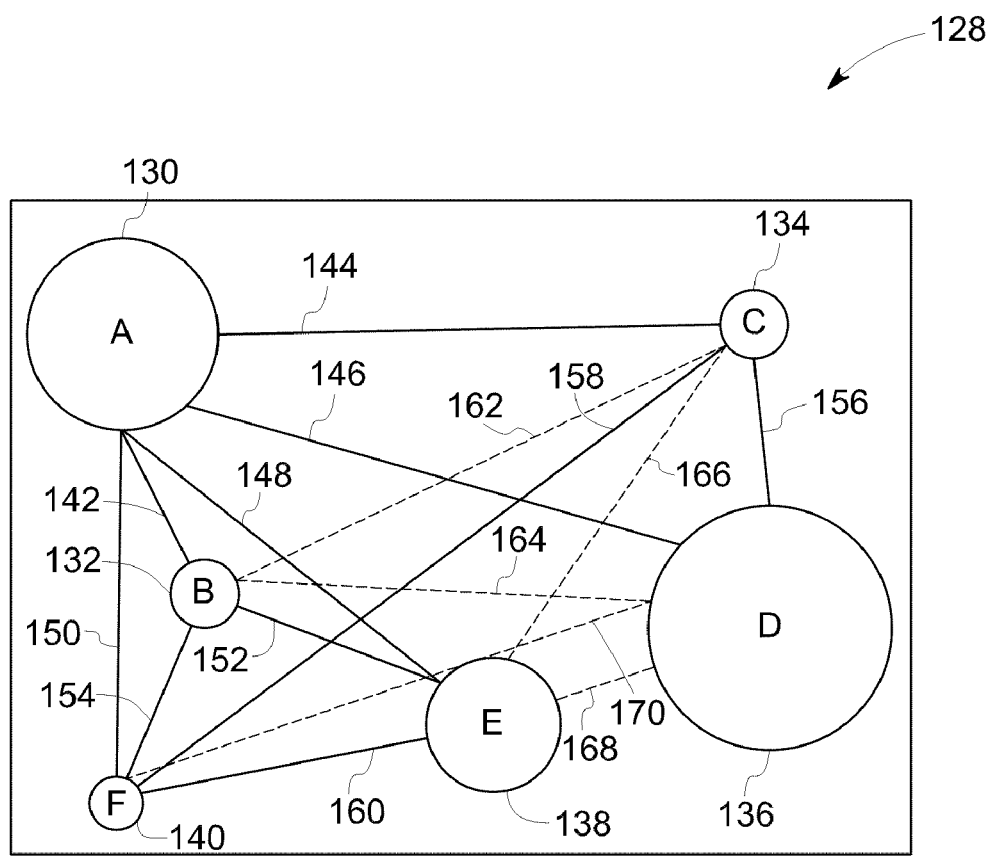
FIG. 7 is a graphical representation constructed based on a single node perspective in accordance with an exemplary embodiment.

Referring to FIG. 7, a graphical representation 128 constructed based on a single node perspective is disclosed. In the illustrated embodiment, the representation 128 is based on a single node perspective, for example node A represented by reference numeral 130. The representation 128 further includes plurality of other nodes B, C, D, E, F represented by reference numerals 130, 132, 136, 138, and 140 respectively. The node cardinality (patent count) of nodes 130, 132, 134, 136, 138, and 140 are 100, 25, 25, 120, 75, and 10 respectively. It should be noted herein that the node cardinality mentioned herein are exemplary values and should not be construed herein as limiting. The present links include AB, AC, AD, AE, AF, BE, BF, CD, CF, and EF are represented by the reference numerals 142, 144, 146, 148, 150, 152, 154, 156, 158, and 160 respectively. The missing links include BC, BD, CE, DE, DF represented by reference numerals 162, 164, 166, 168, and 170 respectively. The potential white spaces (missing links) are identified by identifying pairs of nodes that are not directly coupled (there is no intersection between the two terms) but that are coupled via a third, common node. These opportunities are listed and ranked according to the potentials of the nodes to be coupled.

In the illustrated embodiment, the missing links for the single node 130 are identified by locating pairs of nodes that are not directly coupled but are coupled (triangulation) via the node 130. The missing links are ranked based on potential for extension of existing intellectual property (IP) space, for example combined node cardinality. The missing links are ranked by combined cardinality as follows:

$$DE \rightarrow DA+AE=(120+75)=195$$

$$BD \rightarrow BA+AD=(25+120)=145$$

$$DF \rightarrow AD+DF=(120+10)=130$$

$$CE \rightarrow CA+AE=(25+75)=100$$

$$BC \rightarrow BA+AC=(25+25)=50$$

Although combined node cardinality is discussed, other prioritization criteria including market intelligence or information on intersection strength may be used. Temporal trends may be projected to identify emerging opportunities and estimate their growth potentials. In the illustrated embodiment, neighboring nodes (conceptual peers) of node 130 may be identified to compute peer temporal trends.

In certain embodiments, the prescience of patent (POP) score may be computed in the region of white space opportunities for IP prospecting and forecasting.

$$POP = \log_{10} \frac{(N_1 \times N_2 \times \ldots N_T)^{\frac{1}{T}}}{S}$$

where T is the number of selected terms (nodes) in perspective, Ni is the number of patents with term "i" (count in $node_i$), and S is the number of patents issued in same period of time with all T terms in the specification. The POP Score is indicative of the level of technical maturity and the rate at which potential white spaces are filled. The system computes the dynamic POP score by evaluating the POP Score at different times over a time window of interest. The shape of the curve of the POP score over time illustrates the growth rate of the technical maturity. Similar information can be obtained by plotting the derivative of the POP score against the POP Score (parameterized by time).

Projection techniques may be applied to forecast growth of target nodes (emerging concepts or new nodes). For example, in the illustrated embodiment, the growth rate of node B identified by reference numeral 132 may be forecast using a kernel-based regression technique. The technique involves identifying neighborhood nodes (conceptual peers) and computing the peers' temporal growth rates over a fixed amount of time in the past. For example, a growth function may be represented as follows:

$G(node_i,t)=g_0(node_i,t)$; Kernel is defined as $k[d(node_i, node_j)]$; distance of neighboring nodes to node of interest B is represented as $d(n_i, B)$; contribution values of each node $n_i$, growth rate to growth rate of node B and represented as $k[d(n_i,B)]$. The growth rate of node B is a combination of node B's historical growth rate and a convex sum of B's neighbors growth rates and is computed as follows:

$$g(B) = \alpha \times g_0(B) + (1-\alpha) \times \frac{\sum_{i=1}^{n} K[d(node_i, B)] \times g_0(node_i)}{\sum_{i=1}^{n} K[d(node_i, B)]}$$

Note that parameter $\alpha$ determines the percentage of node B's self-contribution (from its own history).

In an alternate embodiment, the projection technique may include an evolutionary-based fuzzy model approach. The process generates a collection of competing models, evaluates their performance in light of the currently available data, refines the best models using evolutionary search, and selects the best one(s) after a finite number of iterations. This process is typically repeated periodically to automatically produce updated and improved versions of the model.

Projection techniques may also be applied to links to forecast potential growth of identified white spaces (missing links) by using the growth rates of coupled nodes. For example, the cardinality of a link represented by L (A, B) coupling nodes A and B, is bounded by the minimum of the cardinality of each node and is represented as $|L(A,B)| \leq Min\{|A|,|B|\}$. The growth rates of nodes A and B would also be constrained by the same inequality and represented as $G(L(A,B)) \leq Min\{G(A),G(B)\}$.

In an alternate embodiment, the graphical representation may be used for assertion support, in other words detecting possible infringement in support of licensing efforts. The graph may include several nodes (patents) in a clustered form. One node (reference node) may be located at the center and other nodes may be located around the reference node. Assuming a reference patent as the center, the distance from the center indicates differences of other patents from the reference patent. This enables one to analyze individual (similar) patents and drill-down into patents of interest.

As discussed, the analytical tool in one embodiment is automated or semi-automated, provides a content rich graphical view and is easy to use. Also, the tool is capable of performing higher-order analysis. Examples of higher-order analysis includes understanding how a particular competitor is using an optimization technique for innovation, analysis of how company A is compared to company B in terms of innovation, for example, in signal processing technologies for acoustic sensors; identifying what are the top five percent of patents that form the backbone of a particular company's research; or the like. A particular company can use the exemplary tool to enforce IP regions covered by the particular company's patents that might be entered by other companies. The tool could also be used as part of due diligences, to analyze strategic IP strengths of potential acquisitions. Also the tool may be used as part of strategic investment analyses to decide IP regions that are blocked and regions available in areas of interest. The exemplary technique facilitates shortened analysis time, improved scalability, reduced validation efforts, creating assertion opportunities, and uncovering partnership leverages.

Figure 8:
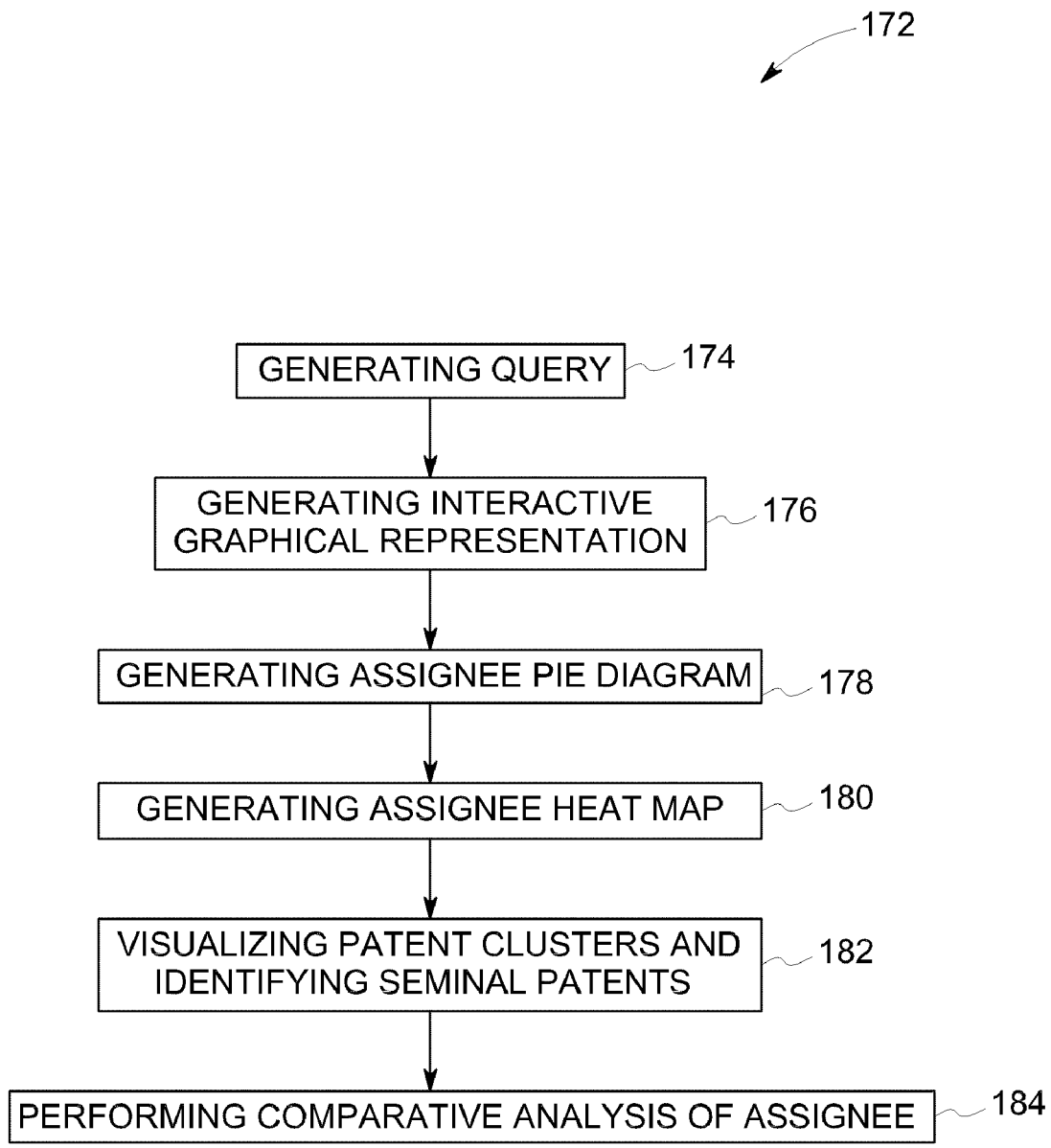
FIG. 8 is process flow chart for landscape analysis using a semi-automated system in accordance with an exemplary embodiment.

Referring to FIG. 8, a process flow 172 for performing landscape analysis using a semi-automated system is disclosed. In the illustrated embodiment, the analysis is related to a hospital optimization domain but this is merely for illustrative purposes to show a working example. The process includes an initial step of using an appropriate interface with a document repository to query and retrieve relevant documents. For example, a crawler is used to retrieve documents from Cite seer, Micro Patent, Aureka, or the like. In this example, a query is generated indicated by 174 in relation to the desired domain. The query may include a plurality of keywords related to the domain, such as hospital optimization. The query may include defining a query for retrieval by using a subset of user-provided keywords (topics, assignees, dates, classification codes, or the like). The query may include defining equivalence classes of keyword synonyms to increase retrieval of patents.

The process further includes generating an interactive graphical representation of neighborhoods of patents connected by similar terms (keywords or labels) indicated by 176. Each node of the graphical representation is indicative of number of patents containing the term (concept) associated with a particular node. For example, one node may be associated with healthcare domain, another node may be associated with optimization domain, yet another node may be associated with hospital domain, and so forth. Each link of the graphical representation is indicative of number of patents containing the terms (concepts) associated to the nodes that are linked. Term subsumption may be used to map more specific terms to broader terms that may be used in the graphical representation. These terms are typically identified and classified to higher-level terms by text mining a corpus of documents and using fuzzy clustering techniques.

The process then further includes generating a pie diagram indicated by 178, such as the assignees related to the hospital optimization domain. The assignees in the pie diagram may be sorted in particular order (increasing or decreasing order) depending on the number of patents assigned to each assignee. For example, the pie diagram may include assignees such as General Electric, Siemens, Hitachi, Nippon Electric, and so forth having patents assigned in the area of hospital optimization.

The process further includes generating an assignee heat map indicated by 180. The assignee heat map may include a number of assignees and the respective number of patents in the associated domain related to hospital optimization. For example, the heat map may indicate the number of patents assigned to General Electric, Siemens, Hitachi, Nippon Electric in the area of patient care. Similarly any number of domain areas and assignees related to hospital optimization are envisaged.

The process also includes visualizing patent clusters (nodes) indicated by 182 based on patent citations. This may also include identifying seminal patents indicative of highly connected nodes. A user may interactively select and modify a subset of patents, by using any of the criteria including patents (or seminal patents) in a node, patents (or seminal patents) in a link, patents (or seminal patents) in a neighborhood (a sub portion of the graphical representation). In one embodiment, seminal patents in nodes may be visualized in a patent view. In another embodiment, seminal patents in neighborhood may be visualized in a heat map.

The process further includes performing comparative analysis of two or more assignees using the graphical representation for various domains indicated by 184, such as related to hospital optimization. For example, green nodes and green links might be indicative that one assignee has stronger presence in certain areas, for example, optimization, statistics, capacity, bed, or the like and red nodes and red links might be indicative that another assignee has stronger presence in the remaining domain areas. In one embodiment, a heat map is used to indicate node cardinality (number of patents) of two or more assignees or competitors in the various domains related to hospital optimization. It should be noted herein that the process flow illustrated herein is an exemplary embodiment and there is no requirement that the process flow proceed in a particular order. It is reiterated herein that the order of the steps may vary depending on the requirement of a user.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A semi-automated method for interactively analyzing a patent landscape, comprising:
   inputting a query to a computing device via an input device, wherein the input device is coupled to one or more databases;
   retrieving a plurality of relevant documents indicative of a conceptual region of the patent landscape from a data warehouse based on the query;
   generating one or more presentations based on the retrieved relevant documents via the computing device;
   augmenting the one or more presentations using one or more reasoning techniques via the computing device;
   conducting competitive analysis of the plurality of relevant patents based on the one or more presentations, using an interactive visualization technique via the computing device; wherein the interactive visualization technique comprises generating an interactive network based graphical representation of a plurality of nodes intercoupled through links; and interactively selecting and modifying one or more portions of the generated network based graphical representation based on at least one criteria; wherein each node is indicative of number of patents of the patent landscape comprising a term representative of the node; wherein each link is indicative of number of patents of the patent landscape comprising one or more terms representative of the nodes coupled via the link;
   evaluating white space opportunities based on the one or more presentations; wherein evaluating white space opportunities comprises identifying pairs of nodes that are not directly coupled to each other;
   listing and ranking the white space opportunities based on nodes that are to be directly coupled to each other;
   applying projection techniques to forecast growth of predetermined target nodes;
   applying projection techniques to links to forecast potential growth of identified white space opportunities;
   computing a dynamic prescience of patent score indicative of a level of technical maturity and a rate at which potential white spaces are filled; and displaying an output based on the competitive analysis and the evaluated white space opportunities via an output device; wherein the competitive analysis output and the evaluated white space opportunities are used for intellectual property enforcement, due diligence, and strategic investment analysis.

2. The method of claim 1; wherein one or more reasoning techniques comprises lexical reasoning, taxonomical reasoning, deductive reasoning, analogical reasoning, temporal reasoning, or combinations thereof.

3. The method of claim 1, wherein lexical reasoning comprises obtaining a set of keywords by automated keyword extraction and merging results of key word extraction.

4. The method of claim 1, wherein taxonomical reasoning comprises augmenting lexical information by using domain ontologies.

5. The method of claim 1, wherein deductive reasoning comprises augmenting lexical information by using predetermined domain rules.

6. The method of claim 1, wherein analogical reasoning comprises use of relationships established in one domain and transferring to another domain.

7. The method of claim 1, wherein the criteria comprises patents or seminal patents associated with a node among the plurality of nodes, a link among the plurality of links, a sub portion of the network based graphical representation, or combinations thereof.

8. A semi-automated system having at least one computing device for interactively analyzing a patent landscape, comprising:
 an input device configured to input a query to a patent database;
 an interactive analytical tool communicatively coupled to the patent database, wherein said tool is configured to extract a plurality of relevant patents indicative of a predetermined conceptual region of the patent landscape; generate one or more presentations based on the retrieved relevant patents; conduct competitive analysis of the plurality of relevant patents based on the one or more presentations using an interactive visualization technique; augment the one or more presentations based one or more reasoning techniques; evaluate white space opportunities based on the one or more presentations and compute a dynamic prescience of patent score indicative of a level of technical maturity and a rate at which potential white spaces are filled; wherein the interactive visualization technique comprises generating an interactive network based graphical representation of a plurality of nodes inter-coupled through links; wherein each node is indicative of number of patents of the patent landscape comprising a term representative of the node; wherein each link is indicative of number of patents of the patent landscape comprising one or more terms representative of the nodes coupled via the link; and
 an output device configured to display an output indicative of an analysis output from the analytical tool;
 wherein the output is used for intellectual property enforcement, due diligence, and strategic investment analysis.

9. The system of claim 8, wherein the criteria comprises patents or seminal patents associated with a node among the plurality of nodes, a link among the plurality of links, a sub portion of the network based graphical representation, or combinations thereof.

* * * * *

UNITED STATES PATENT AND TRADEMARK OFFICE
CERTIFICATE OF CORRECTION

PATENT NO. : 8,412,659 B2  
APPLICATION NO. : 12/463731  
DATED : April 2, 2013  
INVENTOR(S) : Avasarala et al.

Page 1 of 1

It is certified that error appears in the above-identified patent and that said Letters Patent is hereby corrected as shown below:

On the Title Page, in Item (56), under "OTHER PUBLICATIONS", in Column 2, Lines 4-5, delete "Impressionof" and insert -- Impression of --, therefor.

In the Specifications:

In Column 2, Line 63, delete "embodiment," and insert -- embodiment; --, therefor.

In Column 3, Line 9, delete "a an" and insert -- an --, therefor.

In Column 15, Line 7, in Claim 2, delete "claim 1;" and insert -- claim 1, --, therefor.

In the Claims:

In Column 16, Lines 7-8, in Claim 8, delete "based one or more" and insert -- based on the one or more --, therefor.

Signed and Sealed this  
Second Day of July, 2013

Teresa Stanek Rea  
*Acting Director of the United States Patent and Trademark Office*